US012759916B2

(12) United States Patent
Tannas et al.

(10) Patent No.: US 12,759,916 B2
(45) Date of Patent: Oct. 13, 2026

(54) MODULAR ISLAND ASSEMBLIES FOR RECLAMATION AND RESTORATION OF WETLANDS, RESERVOIRS, AND WATERWAYS

(71) Applicant: Great Plains Restoration Solutions Inc., Cremona (CA)

(72) Inventors: Steven Tannas, Cremona (CA); Timothy Hooper, Didsbury (CA)

(73) Assignee: Great Plains Restoration Solutions Inc. (CA)

( * ) Notice: Subject to any disclaimer, the term of this patent is extended or adjusted under 35 U.S.C. 154(b) by 397 days.

(21) Appl. No.: 18/265,279

(22) PCT Filed: Dec. 3, 2021

(86) PCT No.: PCT/CA2021/051727
§ 371 (c)(1),
(2) Date: Jun. 5, 2023

(87) PCT Pub. No.: WO2022/115958
PCT Pub. Date: Jun. 9, 2022

(65) Prior Publication Data
US 2024/0043301 A1 Feb. 8, 2024

Related U.S. Application Data

(60) Provisional application No. 63/121,354, filed on Dec. 4, 2020.

(51) Int. Cl.
*C02F 3/32* (2023.01)
*A01G 31/02* (2006.01)
(Continued)

(52) U.S. Cl.
CPC .............. *C02F 3/327* (2013.01); *A01G 31/02* (2013.01); *B09C 1/08* (2013.01);
(Continued)

(58) Field of Classification Search
CPC .... C02F 3/327; C02F 2103/007; A01G 31/02; B09C 1/08; B63B 2035/4493; Y02A 40/22; Y02P 60/21; Y02W 10/10
(Continued)

(56) References Cited

U.S. PATENT DOCUMENTS 5,799,440 A 9/1998 Ishikawa et al.
9,394,190 B2 7/2016 Curry
(Continued)

FOREIGN PATENT DOCUMENTS

CN 2811281 Y * 8/2006
CN 201087159 Y * 7/2008
(Continued)

OTHER PUBLICATIONS

Machine-generated English translation of CN 107846854, generated on Sep. 16, 2025.*
(Continued)

*Primary Examiner* — Fred Prince
(74) *Attorney, Agent, or Firm* — Billion & Armitage

(57) ABSTRACT

Disclosed are floating island assemblies for phytoremediating a water body, the floating island assembly comprising a buoyant framework for positioning in the water body, the buoyant framework comprising as shell with a foam core material disposed therein, and defining a growing area within the perimeter thereof for growing plants, a grate secured across the framework and below the growing area; and a geotextile material disposed over the grate.

21 Claims, 2 Drawing Sheets

(51) Int. Cl.

| | |
|---|---|
| ***B09C 1/08*** | (2006.01) |
| *B63B 35/44* | (2006.01) |
| *C02F 103/00* | (2006.01) |

(52) U.S. Cl.

CPC . *B63B 2035/4493* (2013.01); *C02F 2103/007* (2013.01); *Y02A 40/22* (2018.01); *Y02P 60/21* (2015.11); *Y02W 10/10* (2015.05)

(58) Field of Classification Search

USPC .......................................................... 210/602

See application file for complete search history.

(56) References Cited

U.S. PATENT DOCUMENTS

| | | | | |
|---|---|---|---|---|
| 2006/0243659 A1* | 11/2006 | Svirklys | C02F 3/327 210/747.6 | |
| 2020/0383276 A1* | 12/2020 | Walker | A01G 9/0295 | |

FOREIGN PATENT DOCUMENTS

| | | | | | |
|---|---|---|---|---|---|
| CN | 107846854 | A | * | 3/2018 | C02F 3/327 |
| CN | 207986787 | U | * | 10/2018 | |
| CN | 108739334 | A | | 11/2018 | |
| CN | 208500522 | U | * | 2/2019 | |
| CN | 110316813 | A | * | 10/2019 | C02F 3/02 |
| CN | 210133937 | U | | 3/2020 | |
| CN | 111439850 | A | * | 7/2020 | C02F 3/34 |
| CN | 211170077 | U | * | 8/2020 | |
| CN | 114031181 | B | * | 2/2023 | C02F 3/302 |
| DE | 202005002795 | U1 | | 5/2005 | |
| ES | 2530762 | B1 | | 5/2016 | |
| JP | H0956279 | A | | 3/1997 | |
| JP | 2001008563 | A | | 1/2001 | |
| RU | 190899 | U1 | | 7/2019 | |
| RU | 2730648 | C1 | * | 8/2020 | A01G 31/02 |

OTHER PUBLICATIONS

Machine-generated English translation of CN 2811281, generated on Sep. 16, 2025.*

Machine-generated English translation of CN 114031181, generated on Sep. 16, 2025.*

Machine-generated English translation of RU 2730648 generated on Sep. 16, 2025.*

Machine-generated English translation of JP H0956279, generated on Sep. 16, 2025.*

Machine-generated English translation of CN 108739334, generated on Sep. 16, 2025.*

Machine-generated English translation of CN 201087159, generated on Sep. 16, 2025.*

Machine-generated English translation of CN 207986787, generated on Sep. 16, 2025.*

Machine-generated English translation of CN 110316813, generated on Sep. 16, 2025.*

Machine-generated English translation of CN 111439850, generated on Sep. 16, 2025.*

Machine-generated English translation of CN 208500522, generated Apr. 7, 2026.*

Machine-generated English translation of CN 211170077, generated Apr. 7, 2026.*

International Search Report and Written Opinion for PCT/CA2021/051727, mailed Mar. 9, 2022.

"Extended European Search Report dated Sep. 27, 2024".

* cited by examiner

MODULAR ISLAND ASSEMBLIES FOR RECLAMATION AND RESTORATION OF WETLANDS, RESERVOIRS, AND WATERWAYS

TECHNICAL FIELD

This disclosure generally relates to the remediation of water bodies. More specifically, this disclosure pertains to floating island assemblies for facilitating the phytoremediation of water bodies.

BACKGROUND

Many water bodies are prone to contamination resulting from human activities, environmental circumstances, wildlife, and the like. For example, the water bodies may be exposed to tailings produced by mining operations, fertilizers and pesticides from agricultural runoffs, and sewage seepage. As well, overpopulation of certain animal species such as waterfowl or environmental shifts resulting from climate change may affect the microbiology of the water bodies. As a result, the water bodies may experience algal blooms or eutrophication, which may be harmful to animals that live in or use the water body as well as to humans.

One solution to treat contaminated natural water bodies is phytoremediation, which is a bioremediation process that uses plants to remove, transfer, or destroy containments contained therein. In practice, for phytoremediation, plants are grown at or adjacent to a water body. As the plants grow, they absorb nutrients as well as inorganic contaminants such as heavy metals and radionuclides through their roots, thereby removing the contaminants from the water body. At the same time, organic contaminants such as pesticides, herbicides, and industrial chemicals may be absorbed and metabolized or transformed by enzymes in the plant or by microorganisms living in association with their roots.

However, phytoremediation has a number of limitations. For example, plants are generally limited to growing around the perimeter of the water body. As a result, the benefits of phytoremediation are diminished for bodies of water covering a large area, as such bodies of water have only minimal contact with the roots of the plants.

Some attempts have been made to increase the accessibility of the water to plants. For example, floating foam mats with plants seeded therein have been used to position plants on top of the water body so that their roots may access the water. However, roots of the plants are capable of breaking apart the foam, which degrades the structure of the mats over time while also releasing foam particles into the water body, which may in turn cause plastic contamination. As well, in practice, the foam mats are difficult to install and, because they absorb water, cannot be relocated after installation.

SUMMARY

Embodiments of the present disclosure generally relate to floating island assemblies for facilitating the phytoremediation of a water body.

According to an example of an embodiment disclosed herein, a floating island assembly for phytoremediating a water body comprises (i) a buoyant framework for positioning in the water body, the buoyant framework comprising an outer shell with a foam core material disposed therein, and defining a growing area within the perimeter thereof for growing plants, (ii) a grate secured across the framework and below the growing area; and (iii) a geotextile material disposed over the grate.

BRIEF DESCRIPTION OF THE FIGURES

The embodiments of the present disclosure will be described with reference to the following drawings in which.

DETAILED DESCRIPTION

Figure 1:
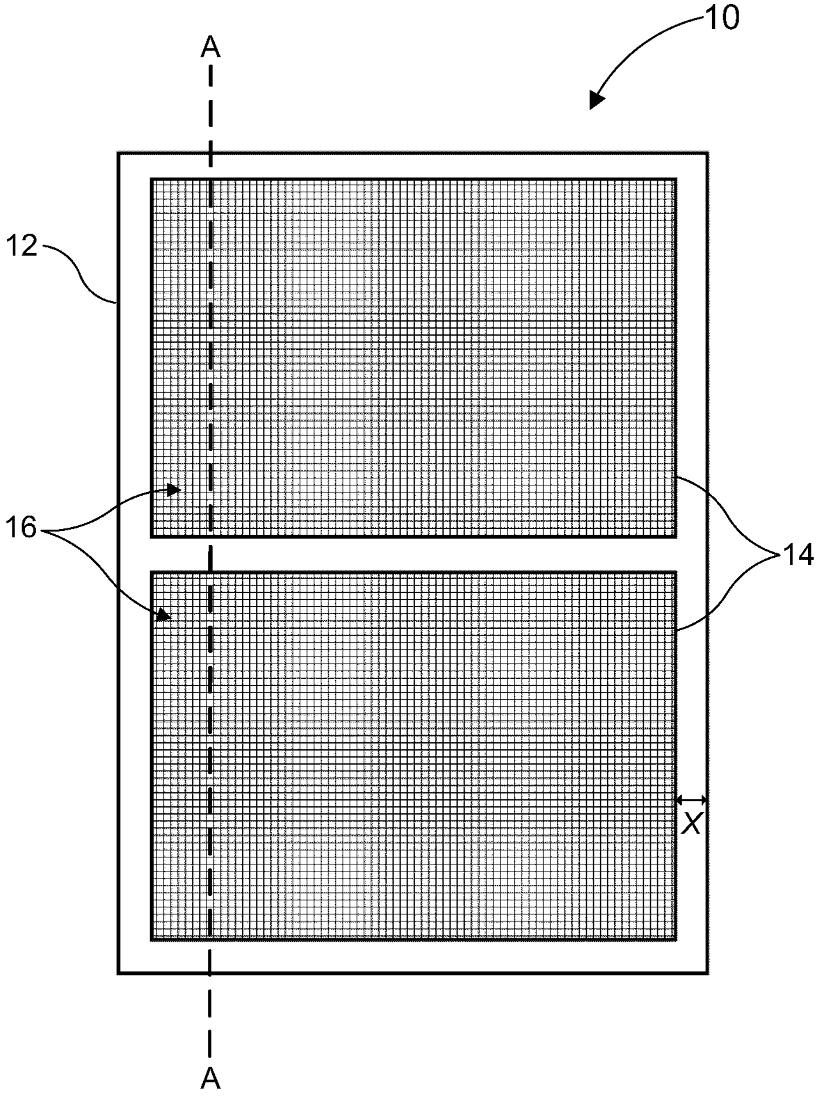
FIG. 1 is a top schematic view of a floating island assembly according to one embodiment of the present disclosure.

The embodiments of the present disclosure generally relate to floating island assemblies for facilitating the phytoremediation of a water body. The floating island assemblies provide inexpensive means for plants to grow on the surface of the water body for extended periods of time, thereby providing the water body increased access to plants for phytoremediation.

The floating island assemblies of the present disclosure may provide a number of advantages. For example, the floating island assemblies, due at least in part to the inclusion of a durable framework, are capable of enduring harsh weather conditions such as North American winters. As described above, the conventional floating islands are generally constructed from foam and, as a result, are easily destroyed by harsh weather conditions including the freezing and thawing of the water body during winter months. However, the floating island assemblies of the present disclosure may be left in the water body during winter or installed on the water body during winter by, for example, forming a hole in any ice present thereon and positioning in the hole the floating island assembly.

Further, the floating island assemblies of the present disclosure may be easily stacked for transported using standard commercial transportation equipment such as flat-deck trucks and flat-deck semi-trailers, even when pre-planted with selected types of plants suitable for phytoremediation, which facilitates bulk shipping, easy delivery, and installation at water bodies. In contrast, the conventional foam islands, cannot be stacked for transport after being planted with vegetation are thus, are unsuitable for bulk transport. Instead, the conventional floating island assemblies must be shipped to a phytoremediation site, then planted, which is significantly less time and cost efficient than the floating island assemblies disclosed herein.

A further advantage of the floating island assemblies is that they are reusable. Once the floating islands are installed on a water body, they may be removed to be replanted, or to be transported to another site, or the like multiple times without affecting the structural integrity thereof. The conventional foam islands, however, once installed on a water body, cannot be removed without destroying the island due at least in part to the water-absorbing foam construction.

Further advantages will be described below and will be readily apparent to those of ordinary skill in the art upon reading the present disclosure.

Reference will now be made in detail to example embodiments of the disclosure, wherein numerals refer to like components, examples of which are illustrated in the accompanying drawings that further show example embodiments without limitation.

In one embodiment, the present disclosure pertains to a floating island assembly for phytoremediating a water body. The floating island assembly comprises a buoyant framework for positioning in the water body wherein the buoyant framework has an outer shell with a foam core material disposed therein, and defines an outer perimeter with containing a growing area for growing plants. The floating island assembly is provided with a grate that is securable to the underside of the framework. Additionally, the floating island assembly is provided a geotextile material disposed over the grate.

As used herein, "floating island assembly" refers to an assembly that is capable of floating on a water body and configured contain plant-growing media therein for plants to grow thereon and therein whereby the plant roots have access to the water body by growing through bottom of the assembly.

As used herein, "water body" refers to any natural or manmade water body such as lakes, sloughs, reservoirs, swamps, and the like. Broadly, in the context of the present disclosure, suitable water bodies for installation of the floating island assemblies thereon are generally still bodies of water, which are suitable for phytoremediation over an extended period of time. It is also noted that the water bodies may be freshwater bodies or saltwater bodies.

As used herein, "buoyant framework" refers to a component of the floating island assembly that defines an area for growing plants within its perimeter. An example embodiment of a buoyant framework is an outer rigid shell with a foam core material disposed therein that provides that framework with floating buoyancy.

As used herein, "foam core material" refers to a polymeric material that is in the form of a foam. The polymeric material generally has a density that provides buoyancy for the framework.

As used herein, "growing area" refers to an area within the perimeter of the buoyant framework that may be configured for growing plants thereon. The bottom growing area is generally flat and extends upward from the bottom to the top of the perimeter of the buoyant framework, and provides access to water bodies by way of a grate that is demountably engageable with the bottom surface of the buoyant framework. Suitable plants for cultivation in the growing area include wetland plants such as sedges, rushes, cattails, manna grasses, bulrushes, march marigolds, marestails, polygonums, and the like.

Figure 2:
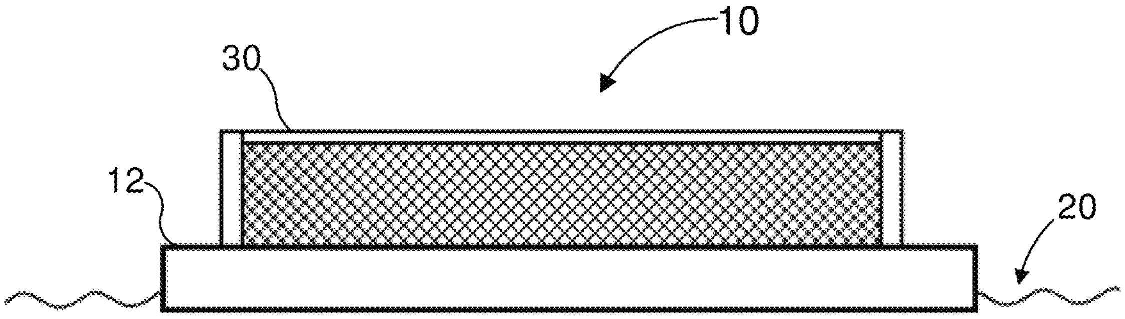
FIG. 2 is a side view of the floating island assembly illustrated in FIG. 1, shown floating a water body.
Figure 3:
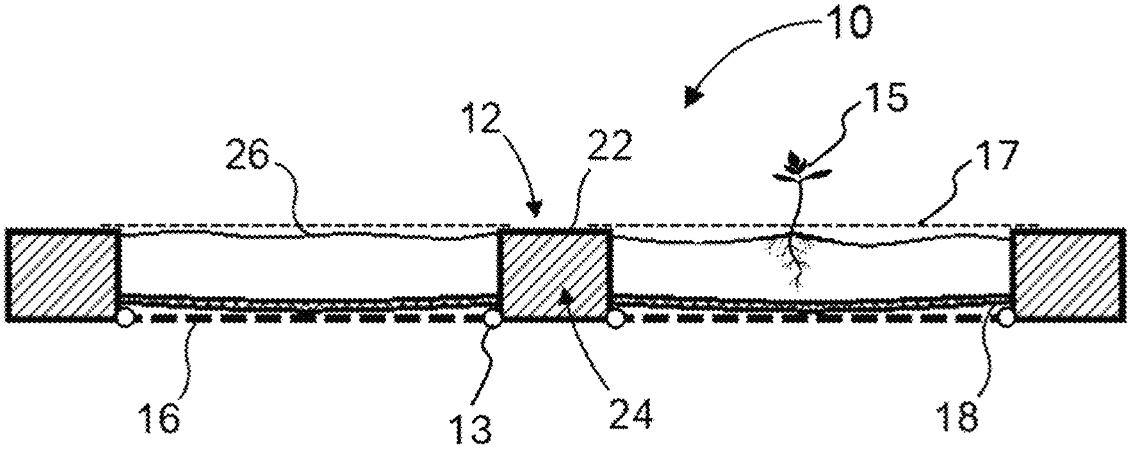
FIG. 3 is a cross-sectional view of the floating island assembly of FIG. 1 along the line indicated A-A, and with a growth medium included therein.

Referring now to FIGS. 1 to 3, therein is shown a floating island assembly according to an embodiment of the present disclosure that is generally identified with the reference numeral 10. The floating island assembly 10 comprises a buoyant framework 12 that defines a growing area 14, a grate 16, and a geotextile material 18.

The buoyant framework 12 is for positioning in a water body 20, as shown in FIG. 2, and, as described above, comprises a shell 22 with a foam core material 24 disposed therein (see FIG. 3). The foam core material 24 provides buoyancy to the buoyant framework 12. The foam core material may have a density of about 10 kg/m$^3$ to about 35 kg/m$^3$. In some aspects, the foam core material may comprise a closed-cell foam. In one aspect, the foam core material may comprise a polystyrene. In such aspects, the polystyrene may be an expanded polystyrene or an extruded polystyrene.

The shell 22 of the buoyant framework 12 protects the foam core material 24 from damage caused by physical impacts such as those that may occur during transport and from weather conditions such as ice, as well as from plant roots growing into the foam core material 24 and destabilizing it. The shell 22 may be formed of a metal such as steel or another durable and/or rust-resistant metal or alloy. In another aspect, the shell may be formed of wood. In such aspects, the shell 22 may be formed of sheet metal that is fastened together by, for example, welding, fasteners such as screws or bolts, and the like. In some aspects, sheet metal may be a 24 ga, 26 ga, or 28 ga sheet metal.

In some aspects, the shell 22 may be coated. The coating (not shown) may provide an additional waterproof seal for the shell 22. The coating may comprise a polymer coating such as a polyurea coating or a polyvinyl chloride coating. In such aspects, the coating may be applied by spraying the shell 22 therewith, dipping the shell 22 therein, or any other industrial containing technique known in the art.

The buoyant framework 12 may be manufactured as a single, integrated piece. That is, once constructed, the buoyant framework 12 may form a continuous shape. For example, the buoyant framework 12 may have a continuous generally rectangular shape, as shown in FIG. 1. However, other shapes are possible and are contemplated. For example, the buoyant framework 12 may have a pentagonal, hexagonal, heptagonal, octagonal, or circular shape.

After construction, the buoyant framework 12 may have a height of about 8 cm to about 16 cm. As well, each beam of the buoyant framework 12 may have a width (designated X in FIG. 1) of about 10 cm to about 20 cm. Thus, each beam of the buoyant framework may have a cross-sectional area of about 80 cm$^2$ to about 320 cm$^2$. Further, the buoyant framework 12 may have a total width of about 125 cm to about 150 cm and a total length of about 250 cm to about 280 cm. As will be appreciated, the dimensions buoyant framework may be more or less than the ranges outlined above depending on, for example, the types of plants 15 to be grown thereon, the size of the water body 20, and the salinity of the water body 20. In more detail, as will be appreciated, adjusting the dimensions of the buoyant framework 12 affects the depth at which it floats in the water body 20. Thus, if the plants 15 to be grown on the floating island assembly 10 require drier growing conditions, the dimensions of the buoyant frame 12 may be adjusted such that the plants 15 and a growth medium 26 (see FIG. 3) have less contact with the water body 20. In one aspect, the buoyant framework 12 is configured such that about ¼ to about ½ of the growth medium 26 is submerged in the water body 20. In a particular aspect, the buoyant framework 12 is configured such that about ⅓ of the growth medium 26 is submerged in the water body 20.

As described above, the buoyant framework 12 defines a growing area 14 within the perimeter thereof. The particular shape of the growing area 14 may depend on the shape of the buoyant framework 12. The growing area 14 may be the entire internal area defined within the perimeter of the buoyant framework 12 or only a portion thereof. In some aspects, the perimeter of the buoyant framework 12 completely surrounds the growing area 14. Further, in some aspects, the buoyant framework 12 may define two or more growing areas 14 within the perimeter thereof. For example, as shown in in FIG. 1, the buoyant framework 12 defines two growing areas 14. Such aspects may be beneficial if increased buoyancy is desired, as there may be an increased amount of buoyant framework 12 positioned in the water body 20. In general, the growing area 14 may have an area of about 2 $m^2$ to about 4 $m^2$.

The growing area 14 may be configured to grow plants therein using the growth medium 26, which may include soil, peat moss, a hydroponic hemp fiber media, or a combination thereof. In some aspects, the peat moss may be modified to include perolite, sand, the like, or combinations thereof depending on the type of plants to be grown therein.

To provide water to the growth medium 26, the floating island assembly 10 comprises the grate 16 secured across the framework 12 and below the growing area 14. The grate 16 provides a surface to support the growth medium 26 while partially submerging it in the water body 20. The grate 16 may be any suitable industrial grate. In some aspects, the grate 16 may be a steel grate. In a further aspect, the grate 16 may be a 1-inch-spaced grate. The grate 16 may also be coated for additional resistance to wear caused by water, transport, weather elements, and the like. In such aspects, the grate 16 may be coated using any technique known in the art with a polymer such as a polyvinylchloride.

The grate 16 may be secured to the buoyant framework 12 using any suitable technique. In some aspects, the grate 16 may be secured to the buoyant framework 12 using clamps, cable ties, blots, screws, welding, or a combination thereof 13. The clamps or cable ties 13 may be secured around a beam of the buoyant framework 12 and through one or more holes in the grate 16.

The floating island assembly 10 also comprises a geotextile material 18 disposed over the grate 16. The geotextile material 18 acts as a porous layer that allows the growth medium 26 access to the water body 20 while also preventing the growth medium 26 from falling through the grate 16 and into the water body 20. In some aspects, the geotextile material 18 may be a nonwoven geotextile material. Further, the geotextile material 18 may have a weight of 4 oz, 6 oz, or 8 oz, or more or less, depending on, for example, the type of growth medium 26 used or the types of plants to be grown. The geotextile material 18 may be secured to the buoyant framework 12 and/or the grate 16 using clamps, cable ties, or any other suitable fasteners known in the art.

In some embodiments, the floating island assembly 10 further comprises a top protecting layer for reducing soil erosion and protecting the plants as they mature. The top layer may be a temporary layer that may be removed when the plants are larger in size. In one aspect, the top layer is a biodegradable top layer 17 that does not need to be physically removed when the plants reach maturity. Instead, biodegradable top layer 17 may be left to degrade over time. In such aspects the top layer may be a biodegradable jute, a coconut matting, or the like. In practice, the biodegradable top 17 layer may be laid over the growth medium 26 and the plants then seeded through cut-outs therein.

As previously described herein, the floating island assemblies 10 of the present disclosure may be modular such that they may be combined to form larger floating combination islands. In such aspects, the buoyant framework 12 may have connection points (not shown) on the sides thereof such that the buoyant framework 12 may be tethered to one or more additional buoyant frameworks 12. The connection points may comprise hooks or loops to receive therethrough chains, cables, cords, ropes, or the like for tethering together two or more of the buoyant frameworks 12. In some aspects the connection points are configured for securing thereto brackets or the like for connecting two or more buoyant frameworks 12 together.

Further, also as previously described herein, the floating island assemblies may be stackable so that they may be shipped in bulk. According to one aspect, the buoyant frameworks 12 may have flat top and bottom surfaces so that the floating island assembly 10 may be positioned on top of or below another floating island assembly 10 in order to form a stack thereof. Once stacked, the floating island assemblies 10 may be secured in place using any industrial shipping means such as straps, cables, and the like. In some aspects, the buoyant framework 12 may have corresponding protrusions and recesses on the top and bottom surfaces thereof in order to reduce the potential of the floating island assemblies 10 sliding when stacked. In practice, the floating island assemblies 10 may be stacked such that, for example, the protrusion on a top surface of a first buoyant frame 12 fits into a recess in a bottom surface of a second buoyant framework 12, thereby reducing their ability to slide relative to one another.

Further, the floating island assemblies 10 of the present disclosure may be stacked with growth medium 26 and seeded plants therein. As a result, the floating island assemblies 10 may be shipped prefabricated with the growth medium 26 and desired plants to a site and then simply installed on the surface of the water body 20.

In a yet further embodiment, the floating island assemblies 10 of the present disclosure may further comprise a fencing 30 to protect the plants from wildlife such as birds, semiaquatic mammals such as beavers or muskrats, and the like. In some aspects, the fencing 30 comprises a frame that is erected over the growing area 14, as shown in FIG. 2. Attached to the sides and over the top of the frame is a fencing material such as chicken wire for preventing animals from accessing the plants by, for example, climbing onto or landing on the floating island assembly 10. In another aspect, the fencing 30 may comprise a grate that is secured over top of the growth medium 26. In such aspects, the plants may be planted in between the holes in the grate.

In some embodiments, the floating island assembly 10 may comprise a flat platform (not shown) for providing a nesting area or floating habitat for animals such as birds above the growing area 14. The platform may be secured to buoyant framework 12 by way of ropes, cables, cords, or the like. Alternatively, in some aspects, the platform may be secured to a grate of the fencing 30. Further, the platform may have a species-specific nesting area or habitat secured thereto. The species-specific nesting area or habitat may comprise, for example, an artificial nest for birds. The species-specific nesting area or habitat may be secured to the platform by way of fasteners such as bolts, screws, or the like. In a yet further aspect, the platform may be coated with a waterproof coating such as a polyurea coating or a PCV coating. In such aspects, the waterproof coating may be applied to the platform by spray coating, dip coating, or any other industrial coating technique.

After installation on the water body 20, the plants are allowed to grow for an extended period of time using the water body 20. As the plants grow, they absorb contaminants that may be present in the water body 20 through their roots. Depending on the nature of the contamination of the water body 20, the plants may be removed after a period of time such as, for example, one or more years. Generally, the plants need only be removed if the contaminants are not degradable or volatilizable by the plants. Such non-degradable and non-volatilizable contaminants are typically instead stored in the biomass of the plants and risk being transferred to grazing wildlife. Non-degradable and non-volatilizable contaminants include various heavy metals. Otherwise, the plants may be allowed to grow without needing to be removed and may, in some cases, be used as vegetation for the grazing of wildlife.

The invention claimed is:

1. A floating island assembly for use in phytoremediation of a water body, the floating island assembly comprising:

a buoyant framework for positioning on the water body, the buoyant framework comprising a shell having a perimeter and a foam core material disposed therein, and defining a growing area within the perimeter thereof for growing plants, a metal grate secured at or near a bottom surface of the buoyant framework around the perimeter, thereby being positioned throughout the area defined by the perimeter and below the growing area;

a geotextile material disposed over the metal grate throughout the area defined by the perimeter; and a growth medium disposed within the growing area atop the geotextile material into which plants are capable of being planted, wherein the growth medium comprising a non-liquid substance in which plants can be grown.

2. The floating island assembly of claim 1, wherein the buoyant framework is a single, integrated piece.

3. The floating island assembly of claim 1, wherein the foam core material comprises a polystyrene.

4. The floating island assembly of claim 3, wherein the polystyrene is an expanded polystyrene, extruded polystyrene, or a combination thereof.

5. The floating island assembly of claim 1, wherein the shell is a metallic shell.

6. The floating island assembly of claim 5, wherein the metallic shell is a steel shell.

7. The floating island assembly of claim 1, wherein the buoyant framework comprises a polymer coating.

8. The floating island assembly of claim 1, wherein the growing area is an area of about 2 $m^2$ to about 3 $m^2$.

9. The floating island assembly of claim 1, wherein the buoyant framework completely surrounds the growing area.

10. The floating island assembly of claim 1, wherein the buoyant framework defines two or more growing areas.

11. The floating island assembly of claim 1, wherein the metal grate is secured to the buoyant framework using clamps, cable ties, bolts, screws, welding, or a combination thereof.

12. The floating island assembly of claim 1, wherein the metal grate is a steel grate.

13. The floating island assembly of claim 1, wherein the metal grate is coated with a polymer.

14. The floating island assembly of claim 1, wherein the metal grate is a 1-inch-spaced grating.

15. The floating island assembly of claim 1, wherein the geotextile material is a nonwoven geotextile material.

16. The floating island assembly of claim 1, wherein the growth medium comprises soil, peat moss, a hydroponic hemp fiber media, or a combination thereof.

17. The floating island assembly of claim 16, wherein the peat moss further comprises sand, perlite, or a combination thereof.

18. The floating island assembly of claim 1, further comprising one or more plants seeded or planted therein.

19. The floating island assembly of claim 18, wherein the one or more plants comprise one or more wetland plants.

20. The floating island assembly of claim 1, further comprising a biodegradable top layer for protecting the growth medium from soil erosion.

21. The floating island assembly of claim 1, further comprising fencing extendable over the growing area for preventing wildlife from accessing the growing area.

* * * * *